US005621859A

United States Patent [19]

Schwartz et al.

[11] Patent Number: 5,621,859
[45] Date of Patent: Apr. 15, 1997

[54] SINGLE TREE METHOD FOR GRAMMAR DIRECTED, VERY LARGE VOCABULARY SPEECH RECOGNIZER

[75] Inventors: Richard M. Schwartz, Sudbury; Long Nguyen, Medford, both of Mass.

[73] Assignee: BBN Corporation, Cambridge, Mass.

[21] Appl. No.: 183,719

[22] Filed: Jan. 19, 1994

[51] Int. Cl.$^6$ .................................. G10L 5/06; G10L 9/00
[52] U.S. Cl. .......................... 395/2.65; 395/2.66; 395/759
[58] Field of Search ................................. 395/2.65, 2.64, 395/2.63, 2.4, 2.45, 2.49, 2.66; 364/419.01, 419.02, 419.03, 419.04, 419.05, 419.06, 419.07, 419.08

[56] References Cited

U.S. PATENT DOCUMENTS

| | | | |
|---|---|---|---|
| 4,741,036 | 4/1988 | Bahl et al. | 395/2.65 |
| 4,748,670 | 5/1988 | Bahl et al. | 395/2.65 |
| 4,984,178 | 1/1991 | Hemphill et al. | 364/513.5 |
| 5,075,896 | 12/1991 | Wilcox et al. | 382/39 |
| 5,241,619 | 8/1993 | Schwartz et al. | 395/2 |
| 5,349,645 | 9/1994 | Zhao | 395/2.52 |
| 5,457,768 | 10/1995 | Tsuboi et al. | 395/2.4 |

OTHER PUBLICATIONS

Placeway et al., "The estimation of powerful language models from small and large corpora", 1993 IEEE international conference on Acoustics, Speech and Signal processinn (ICASSP 93); pp.33–36 vol. 2 Apr. 1993.
Schukat–Talamazzini et al., "Acoustic modelling of sub-word units in the Isadora speech recognizer", 1992 IEEE International conference on Acoustics, Speech and Signal processing, (ICASSP 92), pp. 577–580 Mar. 1992.

(List continued on next page.)

*Primary Examiner*—Allen R. MacDonald
*Assistant Examiner*—Richemond Dorvil
*Attorney, Agent, or Firm*—Lappin & Kusmer LLP

[57] ABSTRACT

The invention provides a method of large vocabulary speech recognition that employs a single tree-structured phonetic hidden Markov model (HMM) at each frame of a time-synchronous process. A grammar probability is utilized upon recognition of each phoneme of a word, before recognition of the entire word is complete. Thus, grammar probabilities are exploited as early as possible during recognition of a word. At each frame of the recognition process, a grammar probability is determined for the transition from the most likely preceding grammar state to a set of words that share at least one common phoneme. The grammar probability is combined with accumulating phonetic evidence to provide a measure of the likelihood that a state in the HMM will lead to the word most likely to have been spoken. In a preferred embodiment, phonetic context information is exploited, even before the complete context of a phoneme is known. Instead of an exact triphone model, wherein the phonemes previous and subsequent to a phoneme are considered, a composite triphone model is used that exploits partial phonetic context information to provide a phonetic model that is more accurate than aphonetic model that ignores context. In another preferred embodiment, the single phonetic tree method is used as the forward pass of a forward/backward recognition process, wherein the backward pass employs a recognition process other than the single phonetic tree method.

32 Claims, 3 Drawing Sheets

OTHER PUBLICATIONS

S. J. Young, "The general use of typing in phoneme-based HMM speech recognisers", 1992 IEEE international conference on Acoustics, Speech and Signal processing (ICASSP 92), pp. 569–572 vol. 1 Mar. 1992.

H. Ney et al., *A Data-Driven Organization of the Dynamic Programming Beam Search for Continuous Speech Recognition*, Proceedings: ICASSP 87, IEEE, vol. 2 of 4, pp. 833–836.

H. Ney et al., *Improvements in Beam Search for 10000-Word Continuous Speech Recognition*, Proceedings 1991 IEEE Workshop on Automatic Speech Recognition, IEEE, pp. 76–77.

H. Ney et al., *Improvements in Beam Search for 10000-Word Continuous Speech Recognition*, 1992 IEEE, pp. I-9—I-12.

P. Placeway et al., *The Estimation of Powerful Language Models from Small and Large Corpora*, IEEE International Conference on Acoustics, Speech, and Signal Processing, Minneapolis, MN, Apr. 27–30, 1993, pp. II-33-36.

X.L. Aubert, *A Fast Lexical Selection Strategy for Large Vocabulary Continuous Speech Recognition*, Speech Recognition and Understanding. Recent Advances, Trends and Applications, NATO ASI Series, vol. F75, pp. 165–170.

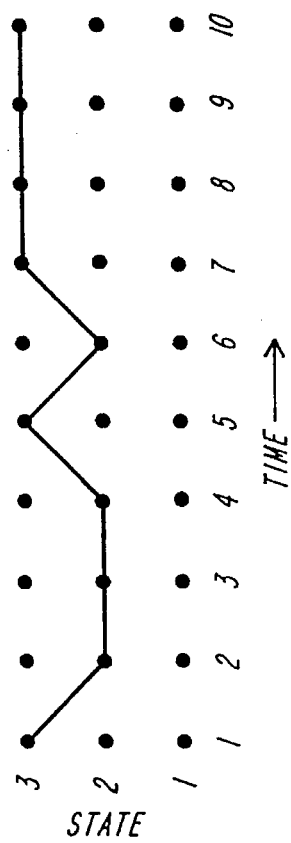
FIG. 2
FIG. 4
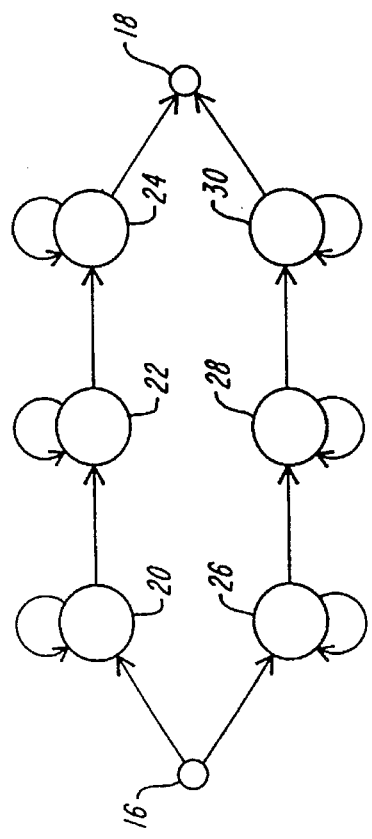
FIG. 1
FIG. 3

SINGLE TREE METHOD FOR GRAMMAR DIRECTED, VERY LARGE VOCABULARY SPEECH RECOGNIZER

FIELD OF THE INVENTION

This invention relates to speech recognition, and more particularly to large vocabulary continuous speech recognition.

BACKGROUND OF THE INVENTION

Currently, the most successful techniques for speech recognition are based on probabilistic models known as hidden Markov models (HMMs). A Markov chain comprises a plurality of states, wherein a transition probability is defined for each transition from each state to every other state, including self transitions. For example, referring to FIG. 1, a coin can be represented as having two states: a head state, labeled by 'h' and a tail state labeled by 't'. Each possible transition from one state to the other state, or to itself, is indicated by an arrow). For a single fair coin, the transition probabilities are all 50% (i.e., the tossed coin is just as likely to land heads up as tails up). Of course, a system can have more than two states. For example, a Markov system of two coins, wherein the second coin is biased so as to provide 75% heads and 25% tails, can be represented by four states, labeled HH, HT, TH, and TT. In this example, since each state is labeled by an observed state, an observation is deterministically associated with a unique state.

In a hidden Markov model, an observation is probabilistically associated with a unique state. As an example, consider a HMM system of three coins, represented by three states, each state corresponding to one of the three coins. The first coin is fair, having equal probability of heads and tails. The second coin is biased 75% towards heads, and the third coin is biased 75% towards tails. Assume the probability of transitioning from any one of the states to another state or the same state is equal, i.e., the transition probabilities between the same or another state are each one third. Since all of the transition probabilities are the same, if the sequence H,H,H,H,T,H,T,T,T,T is observed, the most likely state sequence is the one for which the probability of each individual observation is maximum. Thus, the most likely state sequence is 2,2,2,2,3,2,3,3,3,3 since an observed H is most likely to be a result of the toss of coin 2, while each T is most likely to result from a toss of coin 3. However, if the transition probabilities are not all the same, a more powerful technique, such as the Viterbi algorithm, is required and can be advantageously employed.

Referring to FIG. 2, a sequence of state transitions can be represented as a path through a trellis that represents all of the states of the HMM over a sequence of observation times. Thus, given an observation sequence, the most likely sequence of states in the HMM, i.e., the most likely path through the trellis, can be determined using the Viterbi algorithm.

In a hidden Markov model, each observation is probabilistically associated with a state according to a measure of probability, such as a continuous probability density. Thus, even if the state of the system is known with complete certainty at any one instant of time, an observation is still conditioned according to the probability density associated with the state. Again, given a sequence of observations, the Viterbi algorithm can be used to determine the most likely sequence of states, which is commonly represented as the most likely path through the trellis constructed from the states.

Speech can be viewed as being generated by a hidden Markov process. Consequently, HMMs can be used to model an observed sequence of speech spectra, where specific spectra are probabilistically associated with a state in an HMM. Therefore, for a given observed sequence of speech spectra, there is a most likely sequence of states in a corresponding HMM. Further, if each distinct sequence of states in the HMM is associated with a sub-word unit, such as a phoneme, then a most likely sequence of sub-word units can be found. Moreover, using models of how sub-word units combine to form words, and language models of how words combine to form sentences, complete speech recognition can be achieved to a high degree of certainty.

For example, referring to FIG. 3, a phonetic HMM of a phoneme is represented by a state diagram, where the phoneme may be represented by a network of states, as shown. The number of states may vary depending upon the phoneme, and the various paths for the same phoneme may include different numbers of states. States 16 and 18 are pseudo-states that indicate the beginning and end of the phoneme, respectively. Each of the states 20, 22, 24 is associated with a probability density, i.e., a probability distribution of possible acoustic vectors, such as Cepstral vectors, that correspond to that state. State transition probabilities are determined for transitions between pairs of states, between a state and a pseudo-state, and for self transitions, all transition probabilities being indicated as arrows shown in FIG. 3. Pseudo-states are included to facilitate or simplify the organization of the overall HMM for speech, and are not essential to the model.

Since the probability densities of adjacent phonemes often overlap, as shown in FIG. 4, any given acoustic vector can be associated with more than one state. In FIG. 4, the horizontal axis represents acoustic vectors, and is more specifically related to the power spectrum (with each value modeled as a short vector with, for example, 14 dimensions), while the vertical axis is the probability density. For example the probability densities 32, 34, and 36 overlap, even though they correspond to distinct acoustic states. Consequently, a sequence of acoustic vectors cannot be deterministically mapped to a sequence of acoustic states in the phonetic HMM. Thus, phoneme recognition involves finding the most likely sequence of acoustic states of a phonetic HMM that is consistent with a sequence of acoustic vectors.

The phonetic HMM is developed using supervised learning during a "training" phase. Speech sound and associated phoneme labeling is presented to a speech learning module that develops the phonetic HMM. The density distribution associated with each acoustic state of a phonetic HMM is determined by observing many samples of the phoneme to be modeled. The various state transition probabilities and probability densities associated with each state are adjusted by the speech learning module in accordance with the many different pronunciations that are possible for each phoneme.

An HMM of a word includes a network of phoneroes. Just as there can be more than one state path in a phonetic HMM for representing multiple acoustic sequences that are to be considered as the same phoneme, an HMM of a word can have multiple phonetic sequences, for example, as shown in FIG. 5, for representing multiple pronunciations of the same word. In FIG. 5, each of the two pronunciations of the word is represented by a sequence of states, where the number of states may vary depending on the word and the various paths for the same word may include different numbers of states. Each of the states 38 through 50 is a phonetic HMM, as shown in FIG. 3. The word HMM of FIG. 5 also includes two pseudo-states 52 and 54 that indicate the beginning and end of the word, and are also included to enhance the organization of the overall HMM, and are not essential to the model.

To improve the accuracy of word recognition, language models are often used in conjunction with acoustic word HMMs. A language model specifies the probability of speaking different word sequences. Examples of language models include N-gram probabilistic grammars, formal grammars, such as context free or context dependent grammars, and N-grams of word classes (rather than words). For large vocabulary speech recognition, the N-gram probabilistic grammars are most suited for integration with acoustic decoding. In particular, bigram and trigram grammars, where N is 2 and 3, respectively, are most useful.

Thus, an HMM of speech can be hierarchically constructed, having an acoustic level for representing sub-word units, such as phonemes, a sub-word level for representing words, and a language model level for representing the likely sequences of words to be recognized. Nevertheless, the HMM of speech can be viewed as consisting solely of acoustic states and their associated probability densities and transition probabilities. It is the transition probabilities between acoustic states, and optionally pseudo-states, that embody information from the sub-word level and the language model level. For example, each state within a phoneme typically has only two or three transitions, whereas a pseudo-state at the end of a phoneme may have transitions to many other phonemes.

During a training phase, all parameters of the sub-word model and the language model are estimated. Specifically, training starts with a substantial amount of transcribed speech. From this speech and its transcription, the parameters of a corresponding hidden Markov model are estimated.

To determine the transition probabilities between states at the grammar level, the most likely sequence of words corresponding to an acoustic speech signal must be determined. In principle, the ideal way to find this most likely sequence of words is by considering every possible sequence of words.

For each sequence of words 'W,' to compute the probability of that sequence given the observed acoustic speech signal 'A', it is useful to employ Bayes' rule, wherein the probability $P(W|A)$ of the word sequence W given the acoustic sequence A is factored into three parts:

$$P(W|A)=P(W)*P(A|W)/P(A) \quad (1)$$

wherein $P(W)$ is the probability of the hypothesized sequence of words W, $P(A/W)$ represents the acoustic model, being the probability of the observed sequence given the word sequence and $P(A)$ is the probability of the observed acoustic sequence A.

Then, to solve the speech recognition problem, the word sequence W for which the probability $P(W|A)$ is highest is found. Since A is the same for all hypothesized word sequences, $P(A)$ in the denominator of equation (1) can be ignored, since it does not affect the relative ranking of the hypothesized word sequences. So, in practice, we choose the string W, for which $P(W)*P(A|W)$ is highest. Generally, $P(W)$ is referred to as the language model, which expresses the a priori probability of each possible sequence of words W. $P(W)$ is estimated by compiling statistics on a large body of text, which as previously mentioned, can be established through a training phase.

While the equation for speech recognition, as stated above as equation (1), is theoretically complete, a practical solution is not suggested by the equation for $P(W|A)$ alone. First, it is not feasible to determine $P(W)$ for all possible sequences of words, since the number of possible word sequences is extremely large, growing exponentially with the size of the vocabulary V, i.e., as $V^L$, where V is the number of possible words in the vocabulary, and L is the number of words spoken in a particular sequence. For example, given a vocabulary of 10,000 words, there are $10^{20}$ ($10,000^5$) possible 5 word sequences. Finally, even if these probabilities could reasonably be estimated, the exhaustive search over all possible word sequences for the most likely word sequence would require prohibitively large amounts of computation. Similarly, establishing the probability of each possible acoustic sequence, given any word sequence, is an intractable problem.

Consequently, in practical speech recognition, simplifying assumptions are made so as to estimate the above probabilities, and then efficient search algorithms are used to find the most likely word sequence without considering each complete sequence explicitly.

The estimation of the probabilities is accomplished by making certain reasonable assumptions regarding the independence of sub-sequences of words with respect to other words within the complete sequence. Thus, for example, for the language model, it can be assumed that the probability of the entire sequence of words can be approximated by a limited order Markov chain model which assumes that the probability of each word in the sequence, for example, depends only on the previous one or two words, and the probability of the entire word sequence can be approximated as a product of these independent probabilities. In the case of a bigram grammar, $P(W)=P(w_1,w_2, w_3 \ldots w_n)$, the probability of a word sequence $(w_1,w_2, w_3 \ldots w_n)$ is approximated by:

$$P(w_1)*\pi\{i=2,N\}P(w_i|w_{i-1}) \quad (2)$$

wherein the probability of the first word $(w_1)$ is multiplied by the product of the probability of each subsequent word $w_i$ given the previous word $w_{i-1}$; and in the case of a trigram grammar, $P(W)=P(w_1, w_2, w_3 \ldots w_n)$ is approximated by:

$$P(w_1)*P(w_2|w_1)*\Pi\{i=3,N\}P(w_i|w_{i-1},w_{i-2}) \quad (3)$$

wherein the probability of the first word $P(w_1)$ is multiplied by the probability of the second word given the first word $P(w_2|w_1)$ times the product of the probabilities of each subsequent word $w_i$ given the previous two words $w_{i-1}$ and $w_{i-2}$.

The bigram and trigram grammars are only two of many different available language models in which the language model probability can be factored into a plurality of independent probabilities. The problem of searching the vast space of possible word sequences for the most likely one is made easier because of the independence assumptions relating to the independence of sub-sequences of words. For example, when a bigram language model is used, the complexity of the search is linear in V and in L.

For the acoustic model, similar simplifying assumptions can be made. The acoustic realization of each phoneme is known to depend substantially on preceding and subsequent phonemes, i.e., it is context-dependent. Typically, the word error rate (the percentage of words that are misrecognized) is halved when context-dependent models are used. For example, a triphone model of a phoneme depends on three phonemes; the phoneme itself and both the immediately preceding and immediately following phonemes. Thus, a triphone model assumes and represents the fact that the way a phoneme is pronounced depends more on its immediate neighboring phonemes than on other more temporally distant words or phonemes. Incorporating triphone models of phoneroes in the HMM for speech significantly improves its performance.

Thus, the probability of an acoustic sequence given a word sequence W is given by:

$$P(A|W)=P(a_1 \ldots a_T|W_1 \ldots W_n) \quad (4)$$

which is approximated by $$\Pi\{i=1,N\}P(a_i|ph_{i-1},ph_i,ph_{i+1}) \quad (5)$$

wherein $a_i$ is the acoustic observation sequence that is attributed to phoneme $ph_i$, and wherein the product (5) is the product of the conditional probabilities of each acoustic subsequence given the preceding, current, and succeeding phoneme.

Biphone models are also possible, where a phoneme is modeled as being dependent on only the preceding or following phoneme. For example, a phoneme model that depends on the preceding phoneme is called a left-context model, while a phoneme model that depends on the succeeding phoneme is called a right-context model.

When actually processing an acoustic signal, the signal is sampled in sequential time intervals called frames. The frames typically include a plurality of samples and may overlap or may be contiguous. Nevertheless, each frame is associated with a unique time interval, and with a unique portion of the speech signal. The portion of the speech signal within each frame is spectrally analyzed to produce a sequence of acoustic vectors. During training, the acoustic vectors are statistically analyzed to provide the probability density associated with each state in the phonetic HMM models. During recognition, a search is performed for the state sequence most likely to be associated with the sequence of acoustic vectors.

To find the most likely sequence of states corresponding to a sequence of acoustic vectors, the Viterbi algorithm is employed. In the Viterbi algorithm, computation starts at the first frame and proceeds one frame at a time in a time-synchronous manner. At each frame, a probability score $\alpha$ is computed for each state in the entire HMM for speech. The score $\alpha$ is the joint probability, i.e., the product of the individual probabilities, of all of the observed data up to the time of the frame, and the state transition sequence ending at the state. The score $\alpha$ at state i and time t is thus given by:

$$\alpha(i,t)=MAX\{K\}P(S(i,t,k), A_t) \quad (6)$$

wherein $S(i,t,k)$ is the kth state sequence that begins at an initial state $s_1$ at time 1, and ends at a state $s_i$ and time t, and $A_t$ is the sequence of acoustic observations $a_1 \ldots a_t$ from time 1 to time t.

The above joint probability can be factored into two terms: the a priori probability of the particular state sequence $p(s(i,t))$, and the conditional probability of the acoustic observation sequence $A_t$ given that state sequence $P(A_t|s(i,t))$:

$$\alpha(i,t)=MAX\{k\}P(s(i,t))*P(A_t|s(i,t)) \quad (7)$$

Thus, when analyzing an acoustic signal, a cumulative $\alpha$ score is successively computed for each of the possible state sequences as the Viterbi algorithm analyzes the acoustic signal frame by frame. By the end of the utterance, the sequence having the highest $\alpha$ score produced by the Viterbi algorithm provides the most likely state sequence for the entire utterance. The most likely state sequence can then be converted into the corresponding spoken word sequence.

The independence assumptions used to facilitate the acoustic and language models also facilitate the Viterbi search. According to the Markov independence assumption, since the number of states corresponds to the number of independent parts of the model, the probability of the present state at any time depends only on the preceding state. Similarly, the probability of the acoustic observation at each time frame depends only on the current or present state. This leads to the familiar iteration used in the Viterbi algorithm:

$$\alpha(i,t)=[MAX\{j\}\alpha(j,t-1)*P(i|j)]*P(x(t)|i) \quad (8)$$

wherein $P(i|j)$ is the probability of transition to state i given state j, and $P(x(t)|i)$ is the conditional probability of $x(t)$, the acoustic observation x at time t, given state i.

This algorithm is guaranteed to find the most likely sequence of states through the entire HMM given the observed acoustic sequence. Theoretically, however, this does not provide the most likely word sequence, because the probability of the input sequence given the word sequence is correctly computed by shunning the probability over all possible state sequences belonging to any particular word sequence. Nevertheless, the Viterbi technique is most contrarily used because of its computational simplicity.

Thus, the Viterbi algorithm reduces an exponential computation to one that is proportional to the number of states and transitions in the model and the length of the utterance. However, for a large vocabulary and grammar, the number of states and transitions becomes large and the computation needed to update the probability score $\alpha$ at each state in each frame for all possible state sequences takes many times longer than the duration of one frame, which typically is about 10 ms in duration.

A technique called "beam searching" or "pruning" has been developed to greatly reduce the computation needed to determine the most likely state sequence by avoiding computation of the $\alpha$ probability score for state sequences that are very unlikely. This is accomplished by comparing, at each frame, each score $\alpha$ with the largest score $\alpha$ of that frame. As the $\alpha$ scores for the various state sequences are being computed, if the score $\alpha$ at a state for a particular partial sequence is sufficiently low compared to the maximum computed score at that point of time, it is assumed to be unlikely that the lower scoring partial state sequence will be part of the completed most likely state sequence. In theory, this method does not guarantee that the most likely state sequence will be found. In practice, however, the probability of a search error can be made extremely low.

Comparing each $\alpha$ score with the largest $\alpha$ score is accomplished by defining a minimum threshold wherein any partial state sequence having a score falling below the threshold is rendered inactive. The threshold is determined by dividing the largest score of a frame by a "beamwidth", which is obtained empirically so as to maximize the computational savings while minimizing error rate. For example, in a typical recognition experiment with a vocabulary of 20K words and a bigram grammar, the beam search technique reduces the number of "active" states (those states for which we perform the state update) in each frame from about 500,000 to about 25,000; thereby reducing computation by a factor of about 20. However, this number of active states is still much too large for real time operation, even when a beam search is employed.

Another well-known technique for reducing computational overhead is to represent the HMM of speech as a tree structure wherein all of the words likely to be encountered reside at the ends of branches or at nodes in the tree. Each branch represents a phoneme, and is associated with a phonetic HMM. All the words that share the same first phoneme share the same first branch, all words that share the same first and second phonemes share the same first and second branches, and so on. For example, the phonetic tree shown in FIG. 6 includes sixteen different words, but there are only three initial phonemes. In fact, the number of initial branches cannot exceed the total number of phonemes (about 40), regardless of the size of the vocabulary.

It is possible to consider the beginning of all words in the vocabulary, even if the vocabulary is very large, by evaluating the probability of each of the possible first phonemes—typically around 40 phones. Using an approach like the beam search, many of the low-probability phoneme branches can be eliminated from the search. Consequently, at the second level in the tree, which has many more branches, the number of hypotheses is also reduced. Thus, all of the words in the vocabulary can be considered, while incurring a computational cost that grows only logarithmically with the number of words, rather than linearly. This is particularly useful for recognizing speech based upon very large vocabularies.

However, there are several limitations imposed when a phonetic tree is used. For example, if two words share the same first phoneme, but have a different second phoneme, then the first triphones of the two words are different. One possible solution is to construct a tree using triphones rather than phoneroes. However, this greatly reduces the computational savings introduced by using a tree, since the number of unique branches at each level in the triphone tree would be equal to the number of branches at the following level in the simple phonetic tree.

Also, it is not possible to perform an exact bigram search with a single instantiation of a phonetic tree. In a bigram search, each state transition represents a pair of words, one word from the initial or previous state, and one word from the final or present state. Each pair of words indexes a bigram probability. By contrast, each state in a single instantiation of a phonetic tree is part of many different words that share at least one phoneme. Thus, the final grammar state of a bigram state transition to a state in a single phonetic tree is thereby indeterminate.

Further, the optimal Viterbi search algorithm requires that a separate copy of the path score be kept for every state in the entire HMM of speech, whereas for a single instantiation of a phonetic tree, since each state is associated with many words, many copies of the path score must be stored in each state.

In an attempt to solve this problem, Ney and Steinbiss (Arden House 1991, IEEE International Conference on Acoustics Speech and Signal Processing 1992) use an approach which can be termed a "forest search", wherein a separate phonetic tree is used for words following each different preceding word for bigram modeling. Each phonetic tree can therefore represent all possible present words and final grammar states of a bigram state transition (the present word) from the word ending state of each of a plurality of initial grammar states (the previous word). Thus, each state of any one of the phonetic trees is used following only a single preceding word. Consequently, the optimal Viterbi search can be employed, since a separate copy of the path score can be kept for every state in the entire HMM model.

However, the bigram probability for the word of the phonetic tree, given the word ending state of the previous word, can be applied only at the end of the word of the final state, because the identity of the word of the final state is not known until its last phoneme is reached.

Also, in principle, using a separate phonetic tree to represent the words following each of a plurality of preceding grammar states of a bigram state transition can result in as many trees as there are words in the vocabulary. However, in practice, a beam search is used to eliminate all but the most likely word ending states. That is, the scores of most word ending states are very low. Ney and Steinbiss report that upon each frame, there are typically only about ten words with word ending states having a sufficiently high score. As a result, there are typically only thirty trees with active states.

The states that are active in the different trees may not be the same. Thus, the total number of active states is typically between 10–30 times the number of active states in each tree. This means that much of the savings from using a tree is offset by duplicating the computation for several states that are in common among all the trees. Recall that in the original Viterbi algorithm, each state requires computation only once in each frame.

Ney and Steinbiss report a further computational savings by using a fast match algorithm for each phoneme upon each frame. The phoneme fast match looks at the next few frames of the speech to determine which phonemes match reasonably well. When only context-independent phonetic models are used, this information can be used throughout each of the phonetic trees to predict which paths will result in high scores. However, as stated above, using only context-independent phonetic models results in twice the word error relative to using context-dependent phonetic models. This approach reduces computation by a factor of three. The same computational savings could be obtained if phonetic trees were not used. In fact, the computational savings obtained by using multiple trees—relative to a beam search—is only a factor of five.

According to the technique of Ney and Steinbiss, the "current" word for any state is not known for any but the final states in a phonetic tree. Consequently, the bigram probability of the current word given the previous word(s) cannot be used until the final state of a word is reached. As a result, the pruning of states within a phonetic tree cannot benefit from the grammar score, and must depend solely on the phonetic information of the tree.

In summary, the simple use of multiple phonetic trees suffers from several deficiencies: full triphone acoustic models cannot be used; grammar probabilities cannot be applied until the last state of a word is reached; and computation must be repeated over many trees having the same active states.

OBJECTS OF THE INVENTION

It is a general object of the present invention to provide a method of large vocabulary speech recognition that significantly overcomes the problems of the prior art.

A more specific object of the present invention includes eliminating unlikely words as early as possible in a search of a phonetic tree.

Another object of the invention is to exploit triphone information and statistical grammar information as soon as possible in the search of a phonetic tree, even if the information is not exact.

And another object of the invention is to ensure that the path scores along a path in a phonetic tree changes more continuously and therefore less abruptly than in a typical beam search.

Yet another object of the invention is to reduce computation at a given level of word recognition accuracy.

Still another object of the invention is to increase word recognition accuracy for a given amount of computation.

Other objects of the present invention will in part be suggested and will in part appear hereinafter. The invention accordingly comprises the apparatus possessing the construction, combination of elements, and arrangement of parts, and the method involving the several steps, and the relation and order of one or more of such steps with respect to the others. all of which are exemplified in the following detailed disclosure and in the scope of the application. which will be indicated in the claims.

SUMMARY OF THE INVENTION

The invention provides a method of large vocabulary speech recognition that employs a single tree-structured phonetic hidden Markov model (HMM) for all possible words at each frame of a time-synchronous process. A grammar probability is cumulatively scored upon recognition of each phoneme of the HMM, i.e., before recognition of an entire word is complete. Thus, grammar probabilities are used as early as possible during recognition of a word, and by employing pruning techniques, unnecessary computations for phoneme branches of the HMM having states of low probability can be avoided.

Further, in a preferred embodiment of the invention, phonetic context information can be exploited, even before the complete context of a phoneme is known. Instead of an exact triphone model, wherein the phonemes previous to and subsequent to a phoneme are considered, a composite triphone model is used that exploits partial phonetic context information to provide a phonetic model that is more accurate than a phonetic model that ignores context entirely.

In another preferred embodiment of the invention, the single phonetic tree method of large vocabulary speech recognition can be used as the forward pass of a forward/backward recognition process, wherein the backward pass can exploit a recognition process different from the single phonetic tree method.

BRIEF DESCRIPTION OF THE DRAWINGS

The invention will be more fully understood from the following detailed description, in conjunction with the accompanying figures, wherein:

FIG. 1 is an example of a state transition diagram;

FIG. 2 is an example of a trellis diagram of a Markov process having three states;

FIG. 3 is an example of a state transition diagram of a hidden Markov process for modeling a phoneme;

FIG. 4 is an example of a composite probability density plot;

DETAILED DESCRIPTION OF THE DRAWINGS

Figure 5:
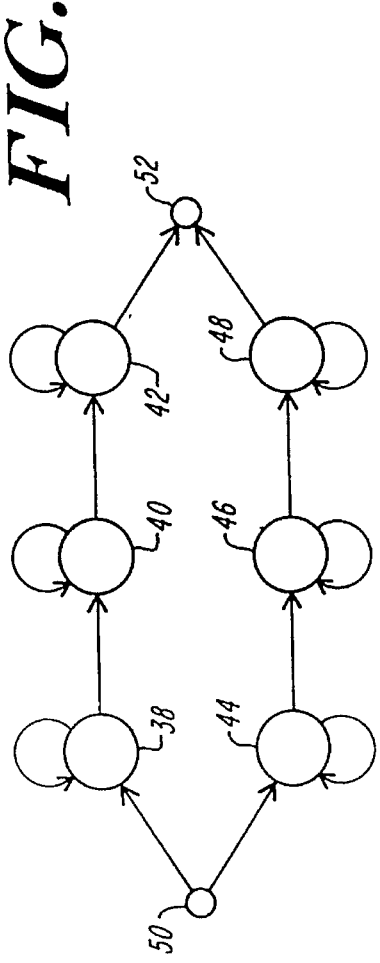
FIG. 5 is an example of a state transition diagram of a hidden Markov process for modeling a word.
Figure 6:
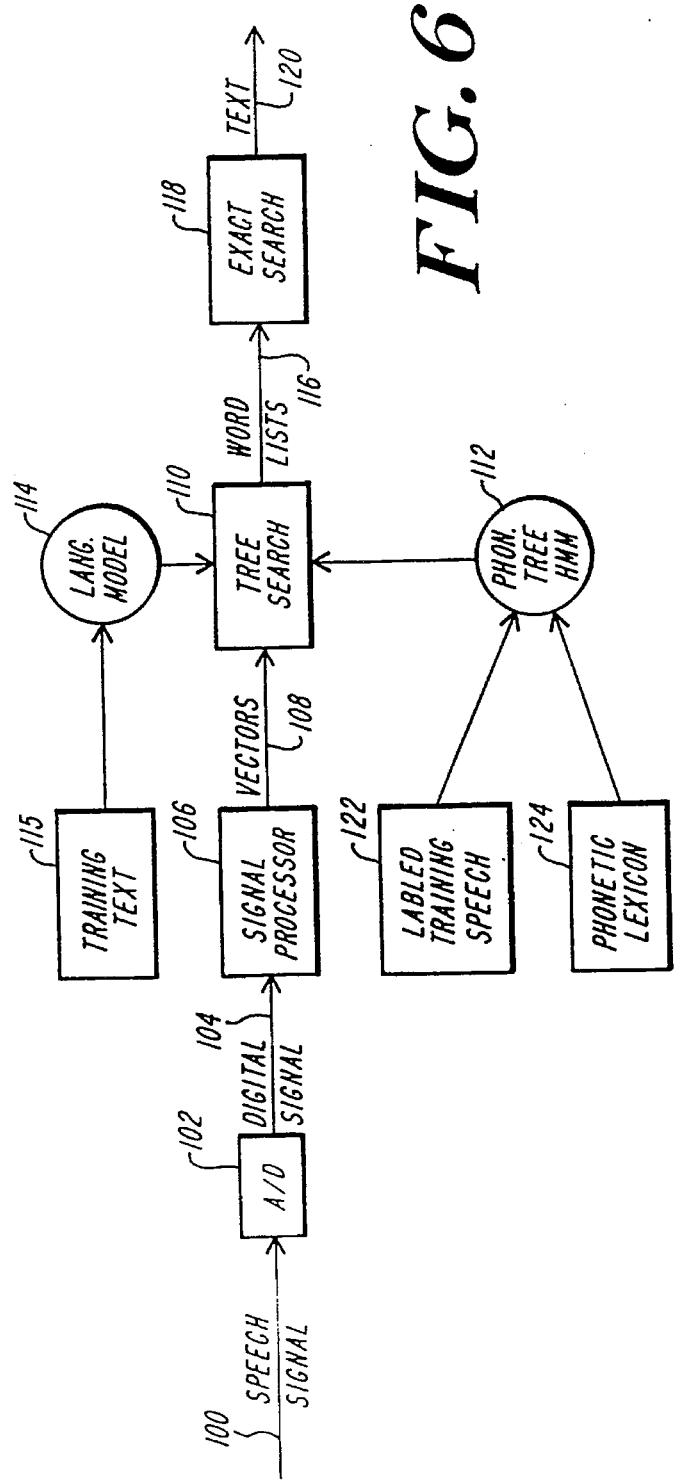
FIG. 6 is a block diagram of the preferred embodiment of a speech recognition system of the present invention.

A general block diagram of a speech recognition system that utilizes the method of the invention is shown in FIG. 6. An analog speech signal 100 is applied to an analog-to-digital (A/D) converter 102 which digitizes the signal 100, and provides a digitized signal 104 to a digital signal processor 106. The A/D converter 102 samples the signal 104 at a predetermined rate, e.g., 16 kHz, and is of a commercially-available type well-known in the art. The signal processor can be of a commercially available type, but in the preferred embodiment of the invention, signal processing functions are implemented in software that is executed by the same processor that executes the speech recognition process of the invention.

The processor 106 divides the digital signal 104 into frames, each containing a plurality of digital samples, e.g. 320 samples each, each frame being of 20 msec duration, for example. The frames are then encoded in the processor 106 by a Cepstral coding technique, so as to provide a Cepstral code vector for each frame at a rate of 100 Hz. The code vector, for example, may be in the form of 8-bit words, to provide quantization of the code vector into 256 types. Such Cepstral encoding techniques are well-known in the speech recognition art. Of course, the invention is not limited to this specific coding process; other sampling rates, frame rates, and other representations of the speech spectral sequence can be used as well.

The Cepstral code vectors generated by the processor 106 are used as an input to a tree search module 110, where a phonetic HMM tree search is preformed in accordance with the invention. The tree search module 110 provides to an exact search module 118 a sequence 116 of lists of likely words together with their current path scores, the current path score of each word having been characterized by the tree search module 110 as being within a threshold of a most likely word. The exact search module 118 then performs a more detailed search, preferably in the backwards direction, but restricts its search to each list of words considered likely in the tree search module 110 to provide an output of text 120 which is the most likely word sequence.

The tree search module 110 uses a language model provided by a statistical grammar module 114 that contains, for example, a bigram probability for each possible pair of words in the vocabulary of the speech signal 100. The bigram probabilities are derived from statistical analysis of large amounts of training text indicated at 115.

The tree search module 110 also uses a phonetic tree HMM 112 that includes a plurality of phonetic HMMs that have each been trained using a set of labeled training speech 122. The phonetic tree HMM 112 incorporates information from a phonetic lexicon 124 which lists the phoneme content of each possible word in the entire vocabulary relating to the speech signal 100. Of course, if a sub-word unit other than phoneroes are employed, a tree HMM based upon the sub-word unit could still be constructed. For example, alternative sub-word units include syllable-like units, dyads or demisyllable-like units, or acoustic units of an acoustic unit codebook.

Single Tree Approximate Search

The method of large vocabulary speech recognition of the present invention employs a single tree-structured phonetic hidden Markov model (HMM) for all possible words at each frame of a time-synchronous process. In general, in accordance with the present invention, language model probabilities are applied as early as possible, i.e., a grammar probability is cumulatively scored upon recognition of each phoneme of the HMM, before recognition of an entire word is complete.

At the end of each branch in the phonetic tree HMM, there may be transitions to several phoneme branches corresponding to smaller sets of common-phoneme words. Thus, branches farther from the root node represent more information about the word under consideration. Given the additional information, the language model transition scores could be different. Therefore, the preceding grammar state having the maximum transition probability into the new phoneme branch having the smaller set of common-phoneme words must be redetermined. To do this, a traceback time associated with each branch is used. The traceback time indicates the frame at which the word under consideration is thought to have begun. At this frame, a list of high-probability preceding grammar states, and their associated path scores, are stored. Each preceding grammar state on the list is reconsidered to find the highest partial grammar score and the associated most likely preceding grammar state. Using this new partial grammar score, the path score of the hypothesis associated with the first state of the new phoneme branch is adjusted to reflect the new phonetic information. The adjustment of the path score always decreases its value, since the new set of common-phoneme words is always a subset of the previous set of common-phoneme words. Finally, the new partial grammar score is stored in the branch, thereby replacing the old partial grammar score.

At the terminal branches in the phonetic tree, the language model score is the probability of an individual word, given the previous grammar state (for example, the previous word in the bigram model and the previous two words in the trigram model). But rather than waiting until the end of the current word under consideration before applying this probability, portions of the grammar score are used earlier. Ideally, grammar score information is used as soon as it becomes available, i.e., with each new smaller set of common-phoneme words. If the grammar score is not used until the end of the word, the only basis for choosing one phonetic branch over another is the acoustic score, which does not narrow down the choices sufficiently, resulting in a combination of greater computational overhead and reduced accuracy. According to the invention, the number of phonetic HMM branches that must be considered is greatly reduced by using the language model score incrementally, i.e., within each word under consideration. This occurs because the path scores along different paths vary more continuously and less abruptly than with the usual beam search where language model probabilities are applied only after every phoneme of each word has been recognized, thereby allowing a narrower beam width to be used.

Moreover, since only one phonetic tree is used at each frame, acoustic computations are performed only once per frame, rather than up to thirty times per frame as in the forest search proposed by Ney and Steinbiss. Instead, the method of the present invention performs a repeated search for the most likely preceding grammar state at each branch in the phonetic HMM tree. In practice, this results in a reduction in computational overhead by a factor of about fifteen.

More specifically, at each frame of the recognition process, a grammar probability is determined for the state transition from a hypothesized most likely preceding grammar state to a set of common-phoneme words known to share at least one common phoneme. Further, the hypothesized most likely preceding grammar state at a frame may be different from the most likely preceding grammar state hypothesized at a previous frame, due to new information provided by the recognition of additional phoneroes. Each state in the HMM is associated with the grammar probability of the hypothesized most likely preceding grammar state of the current frame. The grammar probability is combined at each state in the HMM with the accumulating phonetic evidence to provide the probability that the state lies on the path to the word most likely to have been spoken. Upon each frame, by pruning based upon the current state probability scores, states with a probability appreciably less than the highest state probability score at the frame are rendered inactive to insure that no further computations are performed on subsequent states. A state can be reactivated by another hypothesis with a sufficiently high score.

Further, in a preferred embodiment of the invention, discussed further below, phonetic context information can be exploited, even before the complete context of a phoneme is known. Instead of an exact triphone model, wherein the phonemes previous to and subsequent to a phoneme are considered, a composite triphone model is used to exploit partial phonetic context information within the branch under consideration to provide a phonetic model that is more accurate than a phonetic model that ignores context entirely. For example, the model can use the average of the probability densities of all of the triphones that correspond to that branch in the tree. Thus, the model takes into account the exact preceding phonetic context and partial information about the following phonetic context.

In another preferred embodiment of the invention, discussed further below, the single phonetic tree method of large vocabulary speech recognition can be used as the forward pass of a forward/backward recognition process, wherein the backward pass can exploit a recognition process different from the single phonetic tree method.

Figures 7, 8:
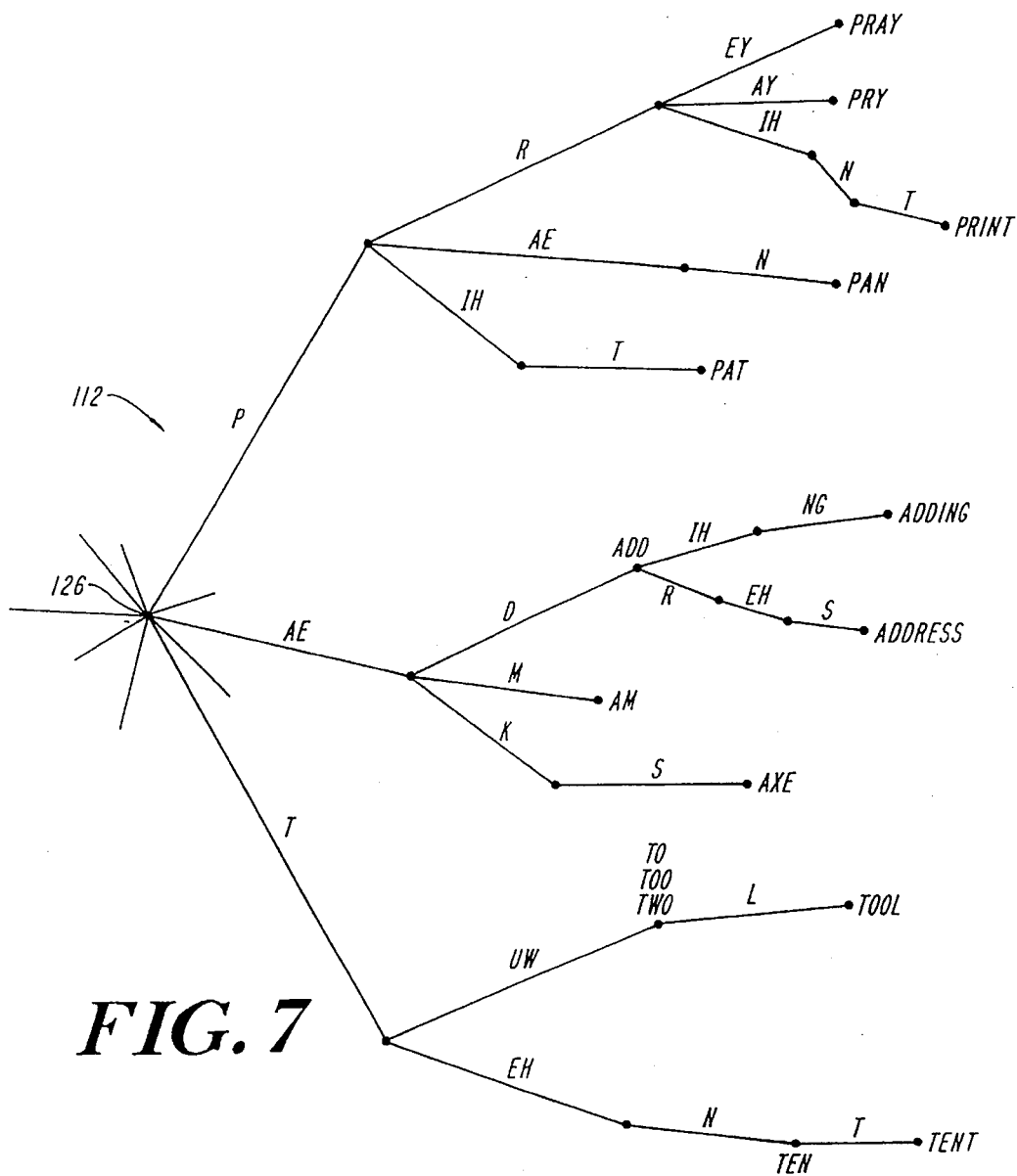
FIG. 7 is an example of a diagram of a portion of a phonetic tree.
FIG. 8 is an example of a portion of bigram probability lookup table.

Referring to FIG. 7, a portion of a simplified phonetic tree is shown. There are about forty to fifty phonemes in the English language. Therefore, the root 126 of a phonetic tree has at most between forty and fifty initial branches, of which three are shown with their associated phonemes, e.g., 'p', 'ae', and 't'. In fact, each of the branches of the phonetic tree HMM 112 is associated with a phoneme. Moreover, each branch is associated with the phonetic HMM that models the phoneme of the branch. A word is associated with the end of each branch that terminates a phoneme sequence that corresponds to a word. A phoneme sequence can correspond to more than one word, i.e., a set of words that sound alike, e.g., the set {to, two, too}. Also, a phoneme sequence that corresponds to a word can be included in a longer phonetic sequence that corresponds to a longer word, e.g., 'ten' and 'tent', or 'to' and 'tool'. Thus, all words that include the same phoneme include a common branch in the phonetic tree.

Each branch, in the phonetic tree 112 has a left-context (that which occurs prior in time) consisting of no more than a single branch which represents the preceding phoneme, and a right-context (that which occurs after in time) that includes at least one branch which represents the succeeding phoneme(s). For example, the branch labeled 'r' has a right-context of the branches labeled by the phoneroes 'ey', 'ay', and 'ih', and has a left-context of the branch labeled by the phoneme 'p'. Of course, the root 126 can have branches that extend to the left (from prior words) as well as to the right. The terminal ends of the branches can also have branches that extend to the right (the beginning of subsequent words), as for example, a branch that extends from the terminal branch of the word "book" that leads to a terminal branch that represents the word "bookkeeping".

Each branch of the phonetic tree is associated with a set of "common-phoneme" words, i.e., a set of words that each include the phoneme of the branch as well as each phoneme along a path to the root node 126. For example, the common-phoneme words of the branch labeled by 'r' include 'pray', 'pry' and 'print'. The common-phoneme words of the branch labeled by 'p' include 'pray', 'pry' and 'print', as well 'pan', 'pat', and 'pit'.

Composite triphone models

Although full triphone acoustic HMM speech models are preferred, it is generally believed that full triphone HMMs cannot be used with a phonetic tree, because at each branch of the tree, only the left-context phoneme is known, while the identity of the phoneme of the right-context is by definition not known, because it remains to be discovered in the future. Further, a phonetic tree HMM based on a full triphone model that exploits both right- and left-context information would have so many branches that the resulting increased accuracy would be prohibitively expensive computationally.

However, according to the invention, given a particular phonetic lexicon 124, some knowledge of the future is possible, as there typically are only a small number of possible phonemes associated with the right-context of the present branch. To more efficiently model dependence on both the left and right phonetic context of a phoneme, without increasing the number of branches in the phonetic tree, the invention employs the concept of "composite" triphone models. At any particular phonetic branch within the tree, the left-context of the branch is precisely known. Typically, the right-context of the branch, i.e., that which follows the phonetic branch in time is not known, because there usually can be more than one following branch in the right-context of the present branch. However, the number of following branches in the right-context of a branch is typically small. For example, in the first level of a phonetic tree there may be fifteen different phoneme branches in the right-context of each initial branch. The average number of branches in the right-context of a branch that is further from the root node however, may be only two, even when the vocabulary includes 20,000 words. As a further example, FIG. 7 shows that the 'r' is preceded only by 'p', but is followed by 'ey', 'ay', and 'ih'. Generalizing, therefore, the number of branches in the right-context of branches near the root node is typically more than the number of branches in the right-context of branches that are further away from the root node of the tree.

For each branch in the tree, a composite triphone model is computed that is derived from the set of triphone models corresponding to that particular branch. For each branch, there being as many triphone HMM's associated with the branch as there are following branches in the right-context of the branch. The resulting composite triphone model is associated with the phoneme branch.

Two functions that can be advantageously used to combine the different density estimates of the composite triphone HMMs, are the average and the maximum. The average of the densities results in the probability density function given the union of the right-contexts, i.e., all of the densities associated with each possible right-context phoneme in the branch are averaged. This corresponds to the best likelihood estimate of the probability density function, given partial knowledge of the context. The maximum function, in which the highest density value of the possible right-context phonemes of the branch, gives a tight upper bound on the probability density function. This has the advantage that the computed scores are never lower than the desired triphone-dependent scores.

Thus, composite triphone models allow phonetic context information to be exploited even though the full phonetic context of a phoneme is not known during the recognition process, because partial knowledge of phonetic context information is known before the recognition process begins.

Grammar Update

Just as phonetic context information is exploited before full phonetic context information is known, language model information can be exploited during the search of the phonetic tree, even though complete knowledge of the most likely present word represented by the phonetic tree is not available until the search of the tree is complete.

In general, an N-gram statistical grammar, or any other type of grammar, can be used. The language model used preferably has a plurality of grammar states and transition probabilities between grammar states, wherein each grammar state includes at least one word. The language model most effective for use with a phonetic tree, and therefore the preferred model, is a bigram statistical grammar, although a trigram statistical grammar can also be used. In a bigram grammar, each state consists of a single preceding word, and in a trigram grammar, each state consists of two preceding words.

In general, for an N-gram grammar model, at the beginning of each branch, for each previous grammar state that ends at the frame just prior to the frame of the present phonetic tree, a composite of the N-gram probabilities is computed based upon the set of common-phoneme words associated with the branch. Where N=1, at the beginning of each branch, the sum of the unigram probabilities of all the common-phoneme words associated with the branch is computed.

To exploit bigram grammar information during the search of a phonetic tree, upon reaching the beginning of a branch of the tree, a set of composite probabilities, one composite probability for each possible previous word of the entire vocabulary, is computed based upon the set of common-phoneme words associated with the branch. (Similarly, to exploit trigram grammar information during a search of a phonetic tree, the composite probabilities provided at the beginning of each branch node of the tree each represent each possible pair of the previous two words computed on the basis of the set of common phoneme words associated with the set.)

There are at least three ways to compute a composite probability. For example, for each previous word it is useful for each composite probability to be either the sum, the maximum, or the average of the bigram probabilities of the common-phoneme words of the set associated with the branch, given the previous word. When computed as the maximum or the sum, the composite probability decreases monotonically as the search proceeds into the tree.

The grammar is represented so as to facilitate access to information regarding each grammar state. In a typical stochastic grammar, such as a bigram or trigram grammar, every word is possible with some probability after each grammar state. For example, if the vocabulary has twenty thousand words, the number of bigram transition probabilities is four hundred million, and the number of trigram transition probabilities is eight trillion. However, a substantial number of the transitions are not observed when trained on a corpus of practical size, such as a corpus of thirty five million words (wherein thirty five million words of text, using the twenty thousand word vocabulary, are used during the training of the system). Moreover, of the observed transitions, typically half are observed only once. Thus, the transition probabilities can be advantageously divided into higher-order transition probabilities, e.g., those transition probabilities that have been observed more than once, and lower-order transition probabilities, e.g., those transition probabilities that have been observed not more than once. For example, it has been observed that, for a vocabulary of twenty thousand words, and a training corpus of thirty five million words, only about two million bigram transitions were observed more than once each. Similarly, for a trigram grammar, it has been observed that, for a vocabulary of twenty thousand words, and a training corpus of thirty five million words, only about four million trigram transitions were observed more than once each. With reference to FIG. 8, an example of a portion of a look-up table for a bigram statistical grammar is shown, wherein each bigram probability is indexed by a pair of words. For some pairs of words observed in the corpus of training text infrequently, the probability is small. In addition, the bigram probability is commonly interpolated with the unigram probability to ensure that no words have probability zero (e.g., Placeway, et al., IEEE International Conference on Acoustics, Speech and Signal Processing, 1993). Thus, it is possible to store a powerful language model in a reasonably small amount of memory.

In general, a transition probability is stored for each transition from each grammar state to each possible following word. A search through an exceedingly large number of transition probabilities is required to access a particular transition probability. However, upon each frame of the process of the invention, composite transition probabilities of transitions between grammar states and sets of following common-phoneme words are used. Consequently, a caching strategy is employed so as to provide fast access to the composite transition probabilities so as to substantially reduce the amount of computation.

To implement the caching strategy, for each active word of a previous frame, i.e., each ending word that has a probability score above a threshold, an array of transition probabilities is stored that includes a transition probability for each transition from the grammar state of the ending word to each common-phoneme word set in the tree. Thus, the array which initially contains all zeros, is the same length as the number of sets of common-phoneme words. The probability of each of the common phoneme word sets observed following the end word is copied into the location in the array corresponding to the set. Each probability can be randomly accessed using a simple memory offset provided in the tree search module 110. When the bigram probability accessed is zero, the unigram probability of the set is used with an appropriate weight instead.

Each state in the phonetic tree-structured HMM is associated with a hypothesis having a path score, a traceback time, and a partial grammar score. The hypothesis of each state is updatable upon the occurrence of each frame. The path score of each hypothesis is updated only if the maximum path score (or sum or average of the path scores) among all hypotheses computed in the preceding frame exceeds a beam threshold value. Upon each frame, the partial grammar score and the traceback time of the dominant hypothesis of the previous frame is propagated into the hypothesis of each state of the present frame.

Following the occurrence of each frame, preferably the sum of the forward path scores (although the maximum, or any other representative function of the path scores, can be used) within each branch of the phonetic HMM tree is computed and stored, and is used to determine whether that branch should be active during the following frame.

The maximum path score of all the hypotheses in the phonetic tree is also computed and stored, and the beam threshold value is recomputed using the maximum path score and a beam width. In addition, for each phoneme branch associated with the last phoneme of a word, a word-ending path score is computed. If the word-ending path score is above the beam threshold, the associated word is included in a list of active ending words, each active ending word being associated in the list with the grammar state that includes the active ending word, and being associated with the word-ending path score that exceeds the beam threshold value. The list of active ending words will be provided to exact search module 118 that implements a "backward search" that uses the list of active words to reduce the scope of the exact search as described hereinafter. The exact search may be any search that provides greater search accuracy; it is not necessary for the exact search to be a tree search.

Also upon each frame, a partial-grammar threshold value is computed that is greater than the beam threshold value and less than the greatest word-ending path score. A list of words for use in a subsequent partial grammar score computation is then compiled, upon each frame, from a list of all words that have ended at the current frame, wherein each word of the list is characterized by a word-ending path score that exceeds the partial-grammar threshold value, and wherein each word of the list is associated with the grammar state that includes the word.

Upon each frame, the greatest word-ending path score is determined and stored for use in computing the list of words having a word-ending path score that exceeds the partial-grammar threshold value, and that is less than the greatest word-ending path score. In a preferred embodiment, the greatest word-ending path score is propagated to and stored at the root node of the phonetic tree.

Whenever a transition occurs from the last acoustic state of a phoneme branch in the HMM, or from the root node, and the path score of the hypothesis associated with the state or node is above the beam threshold, the path score from the last acoustic state of the branch is propagated into the first acoustic state of each following branch, i.e., each branch in the right-context of the ending branch or the root node. This is accomplished in one of three ways. Note that each branch itself, i.e., apart from the states of the branch, can store a traceback time and a partial grammar score for use at a subsequent frame.

If there is only one following branch, the hypothesis (which includes the path score, the traceback time, and the partial grammar score) is propagated into the first state of the following branch.

If there is more than one following branch, for each following branch, if the traceback time of the hypothesis from the last state of the ending phoneme branch is the same as the traceback time that was stored in a following branch at a previous frame, the partial grammar score stored in that following branch is read and becomes the partial grammar score of the hypothesis associated with the first acoustic state of that following branch.

If there is more than one following branch, for each following branch, if the traceback time of the hypothesis from the last state of the ending phoneme branch is not the same as the traceback time that was stored in a following branch at a previous frame, the partial grammar score of the hypothesis associated with the first acoustic state of that following branch is computed by first reading the list of words stored at the frame indicated by the traceback time of the hypothesis. Recall that each word in the list is characterized by a word-ending path score that exceeds the partial-grammar threshold value, and that each word in the list is associated with the grammar state that includes the word. Next, the preceding grammar state is determined that is most likely to transition into the set of common-phoneme words associated with the following branch.

To determine which preceding grammar state is most likely to transition into the set of common-phoneme words, for each preceding grammar state, a product is computed of the path score associated with the ending state of the grammar state, and a function of the conditional transition probabilities over the set of common-phoneme words, given the preceding grammar state, thereby providing a plurality of products, one product for each preceding grammar state. It is then determined which product among the plurality of products is greatest, the preceding grammar state associated with the greatest product being most likely to transition into the set of common-phoneme words, this product becoming the new partial grammar score of the hypothesis associated with the first acoustic state of the following branch. Also, the partial grammar score thus-computed, and the traceback time, are also associated with the branch per se, apart from the states of the branch, for access at a later frame.

The function of the conditional transition probabilities over the set of common-phoneme words can be the sum of the conditional transition probabilities of each word in the set of common-phoneme words, given the preceding grammar state, or it can be the maximum conditional probability of the conditional transition probabilities of each word in the set of common-phoneme words, given the preceding grammar state, or it can be the average conditional probability of the conditional transition probabilities of each word in the set of common-phoneme words, given the preceding grammar state, or any other representative function of the conditional transition probabilities of each word in the set of common-phoneme words, given the preceding grammar state.

Recall that the function of the conditional transition probabilities can be obtained from a grammar cache to provide added speed and efficiency, where the grammar cache is advantageously a random-access data structure, such as an array, wherein the array can be accessed by a simple offset. Thus, when looking up the function of the conditional transition probabilities, the grammar cache is checked first. If the function of the conditional transition probabilities is not in the grammar cache, it is necessary to find the probabilities of observed sets associated with this state. Then, an array whose length is equal to the total number of different sets in the tree is defined. For each observed transition stored with the state, the corresponding entry in the array is set to that probability. The other probabilities are all zero. If this array is needed later for the probabilities of another grammar state, the array is cleared in the same manner.

When the path score of a hypothesis is propagated into a following branch, the path score is adjusted by dividing it by the partial grammar score previously associated with the hypothesis, and by multiplying it by the partial grammar score of the following branch. If the path score is above the beam threshold, and the following branch was not active, the first state of the newly active branch is added to an active list.

Forward-Backward Search

Most of the computation in a beam search, such as the search of the phonetic tree HMM, is used to evaluate the beginnings of all of the words in the vocabulary. Eventually, most of those words will be eliminated from the search, but this usually requires several frames of computation. Thus, if there are 20,000 words in the vocabulary, and every word can follow every other word with some probability, the first one or two phonemes of all 20,000 words might be evaluated in each frame. This computation is extremely expensive, effectively dominating the entire computation.

To solve this problem, an inexact but efficient search is performed, e.g., the search of the tree-structured phonetic HMM as discussed above. At each frame, this first inexact search provides a small set of the most likely words. The inexact search is, in some way, simplified relative to the full model. The simplification is one that reduces computation significantly, with only a small loss in accuracy. At each frame of the inexact search, the path score of every word that ends above a beam threshold is remembered. For example, a typical beam threshold is $10^{-10}$. This usually results in about fifty to one hundred words being above the beam threshold in each frame.

At the end of the utterance, or at some other time that seems practical (e.g., at any pause in the speech) a second recognition pass is performed using a full, more detailed model, but in the backward direction. This backward recognition search would normally get the same answer as a detailed forward search, and requires the same amount of computation. However, since the forward search has provided knowledge of which words should be considered in the backward direction, and the associated word-ending path scores, the amount of computation in the backward pass is considerably reduced.

Since the only purpose of the forward pass is to provide a short list of words to follow in the backward direction, and since several words in the list are kept, some approximations can be made in the model that are not usually made, since they might result in an increased error rate. The backward pass will rescore all of the possible word sequences accurately anyway.

The word-ending path scores give an estimate of the highest possible path score from the present time back to the beginning of the utterance, for paths ending with each word in the vocabulary. The backward pass, up to this same present time, provides the probability for the speech up to the end of the utterance, given this hypothesis. Thus, if the two scores are multiplied, an estimate is provided of the best total utterance score given the backward pass up to this time, and for any hypothesis proceeding to the left using this word.

When these two scores are multiplied, and the product is compared with the usual beam threshold, the vast majority of the words to be considered in the backward direction can be eliminated, thereby reducing the computational overhead by a very large factor. The reduction in computation depends on the size of the vocabulary, and how similar the forward and backward models are. The reduction in computation for the backward pass ranges from a factor of 100 to a factor of 1000. However, the entire utterance must be rerecognized after the speech has finished, potentially causing an annoying delay. Nevertheless, since the backward pass is so fist, it can be performed quickly enough so that the delay imposed is not noticeable.

Since the forward and backward scores can be computed using different models (remember that the forward pass can be computed using an approximate model), relative path scores must be used, rather than total path scores. That is, the score of each ending word is normalized relative to the highest score in that frame, and the score of each backward path is normalized relative to the highest backward score at that frame.

The present invention significantly overcomes the problems of the prior art. The use of composite triphone models and early grammar updates eliminates unlikely words as early as possible and makes it practical to perform a search of a single phonetic tree. The approach therefore exploits triphone information and statistical grammar information as soon as possible in the search of a phonetic tree, even if the information is not exact. The system and method of the invention ensures that the path scores along a path in a phonetic tree changes more continously and therefore less abruptly than in a typical beam search, making it much less likely that the correct answer will be discarded. The approach results in a reduction of computation at a given level of word recognition accuracy, and thus an increase in word recognition accuracy for a given amount of computation. By using a composite triphone model it is practical to exploit triphone acoustic models in a phonetic tree, and make it possible to apply more frequent grammar probability updates before the last state of a word is reached. Finally, the approach makes it practical to accomplish a single phonetic tree search while avoiding unnecessary repetitive computations.

Other modifications and implementations will occur to those skilled in the art without departing from the spirit and the scope of the invention as claimed. Accordingly, the above description is not intended to limit the invention except as indicated in the following claims.

What is claimed is:

1. A method of recognizing a word as being one of a plurality of words in a vocabulary, the method comprising the steps of:

constructing a phonetic tree having a plurality of branches, a phoneme being associated with each branch, a phonetic HMM being associated with each branch so as to model the phoneme, and a word being associated with the end of a sequence of branches, such that all words that include the same initial phoneme sequence include the same initial branches in the phonetic tree, each branch having a left-context consisting of no more than a single branch, and each branch other than final phonemes of a word having a right-context that includes at least one branch;

compiling a statistical language model having a plurality of grammar states and transition probabilities between grammar states, each grammar state including at least one word;

associating with each branch a set of common-phoneme words, each common-phoneme word including the phoneme associated with the branch;

computing, for each set of common-phoneme words and for each preceding grammar state that precedes the set of common-phoneme words, a set transition probability that is a function of the transition probabilities from the preceding grammar state to each common-phoneme word of the set; and upon entering a branch, determining which preceding grammar state of a plurality of preceding grammar states is most likely to transition into a common-phoneme word of the set of common-phoneme words associated with the branch.

2. The method of claim 1, wherein the most likely preceding grammar state is associated with the branch.

3. The method of claim 1, after the step of computing, for each set of common-phoneme words and for each preceding grammar state that precedes the set of common-phoneme words, a set transition probability that is a function of the transition probabilities from the preceding grammar state to each common-phoneme word of the set, further including the step of:

associating the set transition probability with the branch associated with the set of common-phoneme words.

4. The method of claim 1, wherein the step of determining which preceding grammar state is most likely includes the steps of:

for each preceding grammar state of the plurality of preceding grammar states, computing the product of a path score associated with the ending state of the preceding grammar state, and the set transition probability, thereby providing a plurality of products;

determining which product among the plurality of products is greatest, the preceding grammar state associated with the greatest product being the preceding grammar state that is most likely to transition into a word of the set of common-phoneme words.

5. The method of claim 1, wherein the function of the transition probabilities is the sum of the transition probabilities from the preceding grammar state to each word in the set of common-phoneme words.

6. The method of claim 1, wherein the function of the transition probabilities is the maximum transition probability of the transition probabilities from the preceding grammar state to each word in the set of common-phoneme words.

7. The method of claim 1, wherein the function of the transition probabilities is the average transition probability of all the transition probabilities from the preceding grammar state to each word in the set of common-phoneme words.

8. The method of claim 1, wherein the transition probabilities are sometimes obtained from a grammar cache.

9. The method of claim 8, wherein the grammar cache is a random-access data structure.

10. A method of recognizing a word, represented by an acoustic signal adapted to be separated into time interval frames, as being one of a plurality of words in a vocabulary, the method comprising the steps of:

constructing a phonetic tree having a plurality of branches, a phoneme being associated with each branch, a phonetic HMM being associated with each branch so as to model the phoneme, and a word being disposed at the end of a sequence of branches, such that all words that include the same initial phonemes include the same initial branches in the phonetic tree, each branch having a left-context consisting of no more than a single branch, and each branch having a right-context that includes at least one branch;

compiling a statistical language model having a plurality of grammar states and transition probabilities between grammar states, each grammar state including at least one word;

associating with each branch a set of common-phoneme words, each common-phoneme word including the initial phonemes associated with the branch;

computing, for each set of common-phoneme words and for each preceding grammar state that precedes the set of common-phoneme words, a set transition probability that is a function of the transition probabilities from the preceding grammar state to each common-phoneme word of the set;

computing at each frame for each phoneme branch associated with the last phoneme of a word, a word-ending score;

compiling and storing upon each frame a list of words that are each characterized by a word-ending score that exceeds a threshold value, each word of the list being associated with a grammar state;

determining upon each frame, the greatest word-ending score of the list;

for each phoneme-ending state of a phoneme branch, and for the root node, propagating the path score and an associated partial grammar score into each right-context branch thereof, only if the path score at the phoneme-ending state exceeds the threshold value;

adjusting the path score to provide an adjusted path score, upon the path score and the associated partial grammar score being propagated into a right-context branch, by dividing the path score by the associated partial grammar score, and then multiplying by the partial grammar score of the right-context branch; and adding the state associated with the adjusted path score to a list of active states, only if the adjusted path score has exceed the first threshold.

11. The method of claim 10, further including the step of:

associating the set transition probability with the branch associated with the set of common-phoneme words.

12. The method of claim 10, wherein upon each frame, the greatest word-ending score of the list, and the word associated therewith, is propagated to the root node of the phonetic tree.

13. A method of recognizing a word as being one of a plurality of words in a vocabulary, the method comprising the steps of:

constructing a phonetic tree having a plurality of branches, a phoneme being associated with each branch, a phonetic HMM being associated with each branch so as to model the phoneme, and a word being associated with the end of a sequence of branches, such that all words that include the same initial phonemes include the same initial branches in the phonetic tree, each branch having a left-context consisting of no more than a single branch, and each branch having a right-context that includes at least one branch:

determining for each branch as many triphone hidden Markov models of the phoneme associated with the branch as there are branches in the right-context of the branch;

computing for each branch a composite triphone model based upon all triphone models associated with the branch, and associating said composite triphone model with the branch;

compiling a statistical language model having a plurality of grammar states and transition probabilities between grammar states, each grammar state including at least one word;

associating with each branch a set of common-phoneme words, each word including the phoneme associated with the branch;

computing, for each set of common-phoneme words and for each preceding grammar state, the total probability, summed over all the common-phoneme words of a set, that a common-phoneme word of the set will follow a preceding grammar state;

associating a hypothesis having a path score, a traceback time, and a partial grammar score with each state of each phonetic HMM associated with a branch in said phonetic tree, the hypothesis being updatable upon each frame;

updating upon each frame the path score of each hypothesis, only if the path score computed in the preceding frame exceeds a first threshold value;

propagating upon each frame the partial grammar score and the traceback time of the dominant hypothesis of the previous frame to update the hypothesis of each state of the present frame;

remembering upon each frame a partial grammar score and a traceback time of the hypothesis entering a branch with the highest path score;

remembering upon each frame the maximum path score of all phonetic models in the phonetic tree HMM, and recomputing the first threshold value using the maximum path score and a beam width;

computing at each frame, for each phoneme branch associated with the last phoneme of a word, a word-ending score;

compiling upon each frame a first list of words, each word of the first list being associated with a grammar state, and each word of the first list being characterized by a word-ending score that exceeds the first threshold value, the first list of words being for use in a backwards pass of a forward-backward search;

computing upon each frame a second threshold value that is greater than the first threshold value and less than the greatest word-ending score;

compiling and storing upon each frame a second list of words that are each characterized by a word-ending score that exceeds the second threshold value, each word of the second list being associated with a grammar state;

for each phoneme-ending state of a phoneme branch, and for the root node, propagating the path score and an associated partial grammar score into each right-context branch thereof, only if the path score at the phoneme-ending state exceeds the first threshold;

adjusting the path score to provide an adjusted path score, upon the path score and the associated partial grammar score being propagated into a right-context branch, by dividing the path score by the associated partial grammar score, and then multiplying by the partial grammar score of the right-context branch; and adding the state associated with the adjusted path score to a list of active states, only if the adjusted path score has exceed the first threshold.

14. The method of claim 13, wherein the total probability that a common-phoneme word of the set will follow a preceding grammar state is associated with the branch associated with the set of common-phoneme words.

15. The method of claim 13, further including the step of:

representing the grammar so as to facilitate access to information regarding each grammar state, each grammar state being associated with all observed transitions to subsequent words, and to subsequent sets of words, each word and each set of words being associated with a unique index.

16. The method of claim 15, including the step of:

computing, for each set of common-phoneme words, the sum of the unigram probabilities of all the common-phoneme words in the set.

17. The method of claim 13, further including the step of:

propagating upon each frame, the greatest word-ending score to the root node of the phonetic tree.

18. The method of claim 13, wherein the second list of words includes less words than the first list of words.

19. The method of claim 13, wherein the hypothesis also includes a preceding grammar state.

20. The method of claim 13, wherein said second threshold is defined with reference to the highest word-end score.

21. The method of claim 13, wherein the statistical language model is a bigram grammar.

22. The method of claim 13, wherein the representative function of the path scores is the maximum of the path scores.

23. The method of claim 13, wherein the representative function of the path scores is the sum of the path scores.

24. The method of claim 13, wherein the step of propagating upon each frame the path score into each branch of the right context of the branch associated with the phoneme ending state, or of the root node, includes the step of:

propagating the path score, the traceback time, and the partial grammar score directly into the first state of the following phonetic branch, only if there is one phonetic branch in the right-branching context.

25. The method of claim 13, the step of propagating upon each frame the path score into each branch of the right context of the branch associated with the phoneme ending state, or of the root node, includes the steps of:

reading the partial grammar score stored in the branch of the right-context;

propagating that partial grammar score, an entering traceback time, and the adjusted path score into the single branch, only if the entering traceback time is the same as the traceback time stored in the single branch at a previous frame; and using that partial grammar score as the new partial grammar score of the branch, thereby avoiding computing a new partial grammar score for the branch, only if the entering traceback time is the same as the traceback time stored in the branch at a previous frame.

26. The method of claim 13, wherein the step of propagating upon each frame the path score into each branch of the right-context of the branch associated with the phoneme-ending state, includes the step of:

reading the second list of words stored at the frame indicated by the traceback time that is associated with the path score in a hypothesis, each word of the second list of words being associated with a preceding grammar state; and for each branch, determining which preceding grammar state is most likely to transition into the set of common-phoneme words associated with the branch.

27. The method of claim 26, wherein the step of determining which preceding grammar state is most likely to transition into the set of common-phoneme words includes the steps of:

for each preceding grammar state, computing the product of the path score associated with the ending state of the grammar state, and a function of the conditional transition probabilities over the set of common-phoneme words, given the preceding grammar state, thereby providing a plurality of products;

determining which product among the plurality of products is the greatest product, the preceding grammar state associated with the greatest product being most likely to transition into the set of common-phoneme words; and using the greatest product as the new partial grammar score of the hypothesis propagated into the branch.

28. Method of claim 27, wherein the function of the conditional transition probabilities over the set of common-phoneme words is the sum of the conditional transition probabilities of each word in the set of common-phoneme words, given the preceding grammar state.

29. Method of claim 27, wherein the function of the conditional transition probabilities over the set of common-phoneme words is the maximum conditional probability of the conditional transition probabilities of each word in the set of common-phoneme words, given the preceding grammar state.

30. Method of claim 27, wherein the function of the conditional transition probabilities over the set of common-phoneme words is the average conditional probability of the conditional transition probabilities of each word in the set of common-phoneme words, given the preceding grammar state.

31. The method of claim 27, wherein the conditional transition probabilities are sometimes obtained from a grammar cache.

32. The method of claim 31, wherein the grammar cache is a random-access data structure.

* * * * *